United States Patent
Pan et al.

[19]

[11] Patent Number: 5,960,417
[45] Date of Patent: Sep. 28, 1999

[54] IC MANUFACTURING COSTING CONTROL SYSTEM AND PROCESS

[75] Inventors: Yirn-Sheng Pan; Horng-Huei Tseng, both of Hsinchu; Jeng-Tyan Lin, Kaohsung, all of Taiwan

[73] Assignee: Vanguard International Semiconductor Corporation, Hsin-Chu, Taiwan

[21] Appl. No.: 08/620,725

[22] Filed: Mar. 19, 1996

[51] Int. Cl.$^6$ .................................................. G06F 17/60
[52] U.S. Cl. ............................................... 705/400; 705/7
[58] Field of Search .................. 705/7, 28, 29, 705/400

[56] References Cited

U.S. PATENT DOCUMENTS 5,249,120  9/1993  Foley ........................................... 705/1
5,278,751  1/1994  Adiano et al. ........................... 364/402
5,893,082  4/1999  McCormick .............................. 705/400

*Primary Examiner*—Edward R. Cosimano
*Attorney, Agent, or Firm*—George O. Saile; Stephen B. Ackerman; Graham S. Jones, II

[57] ABSTRACT

A computer system for determining the costing of the manufacturing process for a product. The computer system includes the combination of a data base computer and a manufacturing cost computer, the cost computer including a central processor, a memory, and a direct access storage device with tables of data including a product mix table, an equipment table, an overhead table, a direct material table, a direct material standard usage table, and a rework table, the system for preparing data for use in costing, calculating hourly rates for a part, calculating final costs for a part; and calculating part costs for a part.

18 Claims, 5 Drawing Sheets

IC MANUFACTURING COSTING CONTROL SYSTEM AND PROCESS

BACKGROUND OF THE INVENTION

1. Field of the Invention

This invention relates to a computer system and a process for calculation of integrated circuit (IC) manufacturing costs and more particularly to cost control with such a manufacturing system and process.

2. Description of Related Art

U.S. Pat. No. 5,278,751 of Adiano et al for "Dynamic Manufacturing Process Control" describes a method and system using a database pertaining to quality to change at least one product parameter in an interactive computer based manufacturing control system. The system integrates changes and customer feedback responses into the manufacturing process.

SUMMARY OF THE INVENTION

In accordance with this invention a computer system is provided for determining the costing of the manufacturing process for a product. The computer system includes the combination of a data base computer and a manufacturing cost computer. The cost computer includes a central processor, a memory, and a direct access storage device with tables of data including a product mix table, an equipment table, an overhead table, a direct material table, a direct material standard usage table, and a rework table. The system provides the functions as follows:

A) preparing data for use in costing,
B) calculating hourly rates for a part, and
C) calculating final costs for a part.
D) calculating part costs for a part.

It is also preferred that the steps are provided wherein the function of preparing data for use in costing includes entering cost data into the cost computer and forming tables of data therein, and downloading data from the data base computer into tables in the cost computer. Data is downloaded from the data base computer to the cost computer. A sequence of steps is provided for defining global variables. A sequence of steps is provided for providing a recipe for costing; data is downloaded from the data base computer to the cost computer. A sequence of steps is provided for defining global variables. A sequence of steps is provided for providing a recipe for costing.

In accordance with this invention a computer system for determining the costing of the manufacturing process for a product is provided. The computer system includes a data base computer and a manufacturing cost computer, the cost computer including a central processor, a memory, and a direct access storage device with tables of data including a product mix table, an equipment table, an overhead table, a direct material table, a direct material standard usage table, and a rework table including as follows:

A) prepare data for use in costing by the steps as follows:
1) enter cost classification data into a classified cost table in the memory in the cost computer,
2) define the product mix table in the storage device,
3)
  a) define the equipment table in the storage device,
  b) define direct material usage in the direct material table and the direct material standard usage table in the storage device,
4)
  a) define the overhead table in the storage device,
  b) define the rework table in the storage device,
5) download data into the recipes table and the parts table from the data base computer into the recipes table and the parts table in the storage device,
6) define a global variables cost table in a global variables location in the memory,
B) calculate hourly rates for a part by the steps as follows:
1) the cost computer calculates required hours and required runs data for equipment by accessing production quantity data from the product mix table in the storage device and equipment type data from the parts table in the storage device,
2) the cost computer calculates depreciation rate data from the required hours and the required runs data and from the equipment table,
3) the cost computer calculates overhead from the required hours and the required runs data and from data obtained from the storage device in the overhead table,
C) calculate final costs for a part by the steps as follows:
1) the cost computer calculates direct material recipe cost data from data in the classified cost table and from the global variables table in the memory,
2) the cost computer calculates costs by the steps as follows:
  a) the cost computer calculates direct labor cost from data from the direct material data and from the global variables in the memory,
  b) the cost computer calculates depreciation recipe cost data from the overhead rate data and from the direct labor cost data in the memory,
  c) the cost computer calculates overhead recipe cost data from depreciation data and from overhead rate data, and
3) the cost computer calculates mask depreciation cost data from the global variables table and from the overhead cost data, and
4) sum the recipe cost for a part,
D) calculates part costs for a part by the steps as follows:
1) downloads recipes for costing of a part from the data base computer,
2) calculates the recipe costs as a function of the recipes for costing and the mask depreciation cost, the calculating recipe cost from the direct material cost data, the direct material cost data, the labor cost data, the recipe cost data and the mask cost data, and
3) determine part cost of the by summing the cost of the recipes to build the part.

In accordance with another aspect of this invention, a method is provided for operating a computer system for determining the costing of the manufacturing process for a product.

The computer system includes the combination of a data base computer and a manufacturing cost computer, the cost computer including a central processor, a memory, and a direct access storage device with tables of data including a product mix table, an equipment table, an overhead table, a direct material table, a direct material standard usage table, and a rework table, the system provides the functions as follows:

A) preparing data for use in costing,
B) calculating hourly rates for a part, and
C) calculating final costs for a part.

Preferably, the method of operating a computer system includes the steps as follows:

D) calculating part costs for a part.

It is also preferred that the method includes the steps wherein the function of preparing data for use in costing includes entering cost data into the cost computer and forming tables of data therein, and downloading data from the data base computer into tables in the cost computer; data is downloaded from the data base computer to the cost computer. A sequence of steps is provided for defining global variables. A sequence of steps is provided for providing a recipe for costing; data is downloaded from the data base computer to the cost computer. A sequence of steps is provided for defining global variables; and a sequence of steps is provided for providing a recipe for costing.

In accordance with another aspect of this invention, a method is provided for operating a computer system for determining the costing of the manufacturing process for a product where the computer system includes a data base computer and a manufacturing cost computer, the cost computer including a central processor, a memory, and a direct access storage device with tables of data including a product mix table, an equipment table, an overhead table, a direct material table, a direct material standard usage table, and a rework table. The steps of the invention are the following:

A) preparing data for use in costing by the steps as follows:
1) entering cost classification data into a classified cost table in the cost computer memory,
2) defining the product mix table in the storage device,
3)
   a) defining the equipment table in the storage device,
   b) defining direct material usage in the direct material table and the direct material standard usage table in the storage device,
4)
   a) defining the overhead table in the storage device,
   b) defining the rework table in the storage device,
5) downloading data into the recipes table and the parts table from the data base computer into the recipes table and the parts table in the storage device,
6) defining a global variables cost table in a global variables location in the memory, B) calculating hourly rates for a part by the steps as follows:
1) the cost computer calculating required hours and required runs data for equipment by accessing production quantity data from the product mix table in the storage device and equipment type data from the parts table in the storage device,
2) the cost computer calculating depreciation rate data from the required hours and the required runs data and from the equipment table,
3) the cost computer calculating overhead from the required hours and the required runs data and from data obtained from the storage device in the overhead table, C) calculating final costs for a part by the steps as follows:
1) the cost computer calculating direct material recipe cost data from data in the classified cost table and from the global variables table in the memory,
2) the cost computer calculating costs by the steps as follows:
   a) the cost computer calculating direct labor cost from data from the direct material data and from the global variables in the memory,
   b) the cost computer calculating depreciation recipe cost data from the overhead rate data and from the direct labor cost data in the memory,
   c) the cost computer calculating overhead recipe cost data from depreciation data and from overhead rate data, and
3) the cost computer calculating mask depreciation cost data from the global variables table and from the overhead cost data, and
4) summing the recipe cost for a part.

Preferably additional steps are as follows:

D) calculating part costs for a part by the steps as follows:
1) downloading recipes for costing of a part from the data base computer,
2) calculating the recipe costs as a function of the recipes for costing and the mask depreciation cost, the calculating recipe cost from the direct material cost data, the direct material cost data, the labor cost data, the recipe cost data and the mask cost data, and
3) determining part cost of the by summing the cost of the recipes to build the part.

BRIEF DESCRIPTION OF THE DRAWINGS

The foregoing and other aspects and advantages of this invention are explained and described below with reference to the accompanying drawings, in which.

DESCRIPTION OF THE PREFERRED EMBODIMENT

Figure 1A:
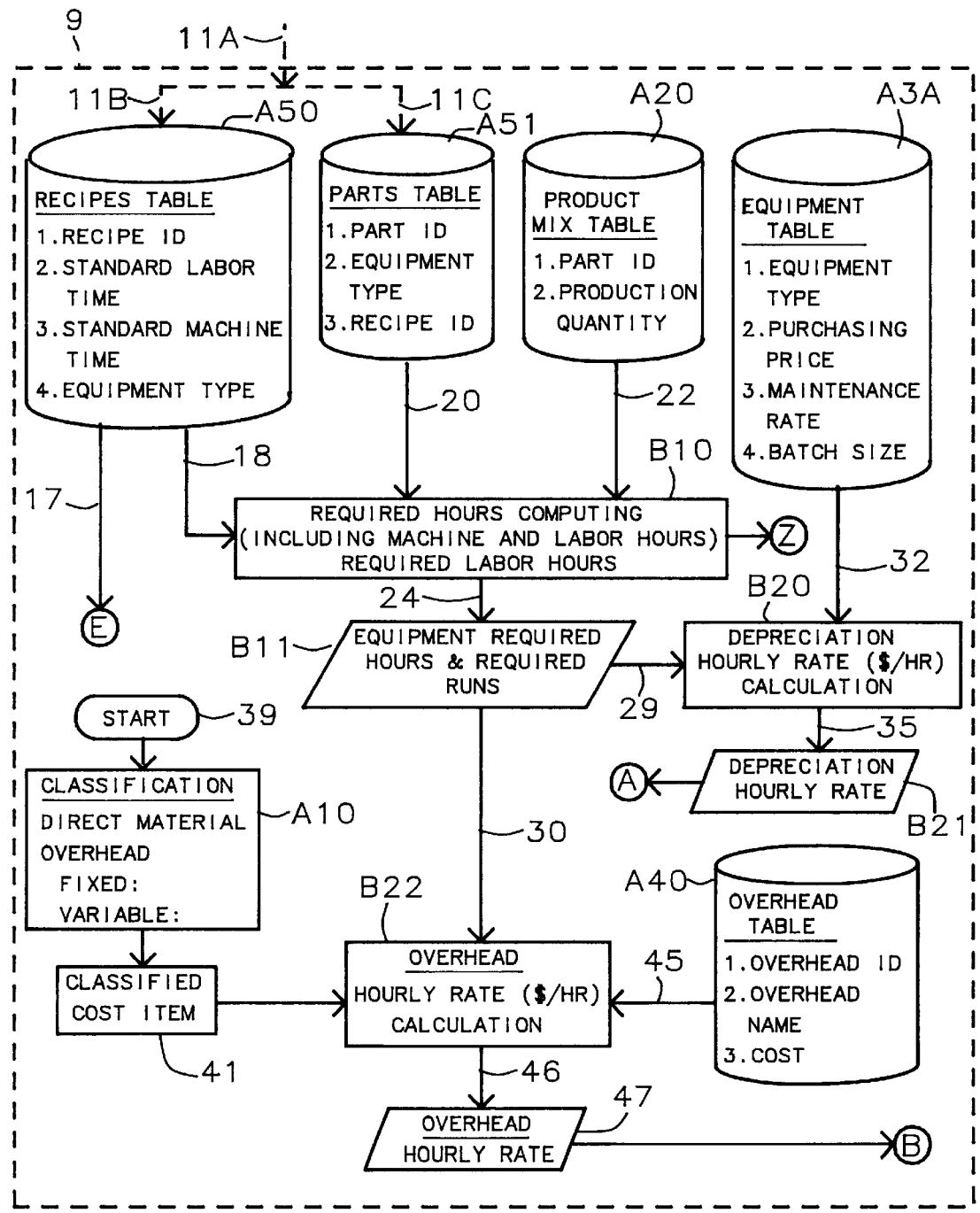
FIG. 1A shows a flowchart of a portion of the contents of the microcomputer of FIG. 1B connected to lines within the microcomputer.

An IC (integrated circuit) manufacturing costing sequence of steps for a shop floor control system is provided by this invention. In accordance with a shop floor control system which controls the manufacture of parts, procedures, recipes, operations, and documentation, the cost of a recipe is focussed upon in accordance with this invention. When data is acquired pertaining to the recipe cost of a manufacturing process, the part, loop test (i.e. research and development test run for a few layers or several recipes) cost is also acquired. The steps employed in the method and system of this invention provide an hourly rate which can be multiplied by standard times.

The standard times are built into the recipe and the hourly rate can be calculated as the total cost of the budget divided by the required number of hours to perform the sequence of steps. The required hours are obtained by a set of data defining the product mix and the parts flow of the product mix. The first step is to construct the cost structure by a recipe. Due to different characteristics of cost elements, the cost elements of the manufacturing process whose cost structure is being dealt with by this invention are six elements comprising direct material, direct labor, equipment depreciation, overhead, batch type overhead, and mask usage expense.

1. Direct Material

Direct Material (DM) costs include those of the raw wafers, photoresist, and targets. These costs are definitely defined for a wafer. DM standard usage is defined in a recipe. The recipe DM ID, DM name and the unit price are stored in Direct Material table A3B0 in FIG. 3A stored in disk storage device 8 in FIG. 1B.

2. Direct Labor (DL)

Only the on-line DL operators are included in the data base. The DL hourly rate is obtained from the DL budget divided by the number of available hours in a month.

3. Equipment Depreciation

Based on the equipment purchasing price, the length of the depreciation year and the required equipment hours, the hourly rate of equipment depreciation is calculated.

4. Overhead

Overhead costs such as housing costs, building costs, indirect labor costs and indirect material costs are included. The hourly rate of the overhead costs is calculated from the monthly budget divided by required equipment hours.

5. Batch type overhead

Batch type overhead comprises the costs of materials used in a batch manufacturing process, such as the cost of special gases and chemicals used in the batch process. The standard usage of batch type overhead is based on costs per batch. For example, a batch may include twenty-four (24) pieces or forty-eight (48) pieces being treated in a single batch operation. Thus, the hourly rate is calculated starting with the per batch cost multiplied by the required run and divided by the number of hours of required equipment. The required run can be acquired by product mix and their process flow.

6. Mask Usage

The mask usage expenses are always allocated to the stepper recipe because the masks are always used in the stepper recipe.

Figure 1B:
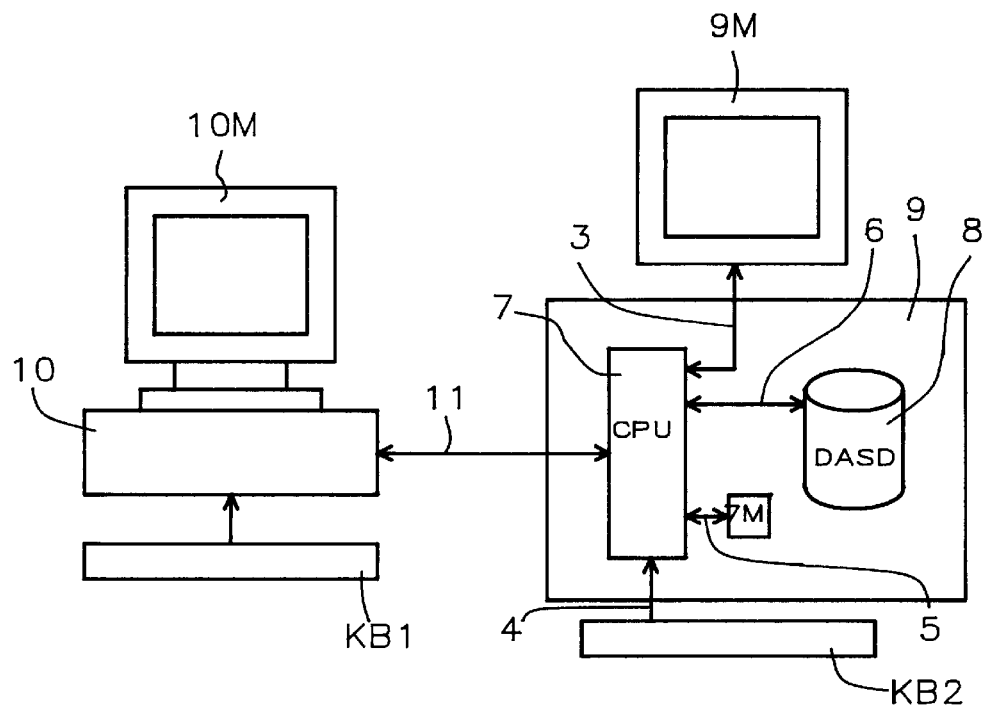
FIG. 1B shows a block diagram of a computer system including a database computer system (host computer for a shop floor control system) connected to a microcomputer.

FIG. 1B shows a block diagram of a computer system including a database computer system 10 (host computer for shop floor control system) with a display monitor 10M and a keyboard KB1. Database computer system 10 is connected by line 11 to a microcomputer 9 (for example a PC (Personal Computer)) which includes the usual components such as a central processing unit (CPU) 7 and a direct access storage device 8 (such as a conventional magnetic storage disk drive) connected to CPU 7 by line 6, a memory 7M connected to CPU 7 by line 5, a display monitor 9M connected to CPU 7 by line 3, a keyboard KB2 connected to CPU 7 by line 4 (a printer and other optional components which may be included but are not essential are not shown for convenience of illustration.) The database computer system 10 is connected by line 11 to the CPU 7 which is connected to DASD 8 by means of line 6 which receives much of the data flowing into the CPU 7 from the database computer system 10. DASD 8 stores much of the data required for this invention. Other paths of data flow in microcomputer 9 are not shown (for convenience of illustration) since they will be well understood by those skilled in the art.

The operation of the system of FIG. 1B is described in further detail below with relation to the process of this invention with reference to FIGS. 1A, 2, 3A, 3B and 5.

FIG. 1A shows a flowchart of a portion of the process performed in accordance with this invention by the microcomputer 9 of FIG. 1B. Paths of data from the database computer system are shown with data flowing on phantom line 11A to lines 11B and 11C flowing to the DASD 8 in the microcomputer 9. Some of the data in DASD 8 of FIG. 1A comprises tables A50, A51, A20, A3A and A40 in FIG. 1A. DASD 8 also stores the data in tables, A3B1, and A4B0 in FIG. 3A. Those tables are located in and are accessed from DASD 8 by the microcomputer 9 using conventional computer operations as will be well understood by those skilled in the art.

FIG. 1A illustrates the location of tables in the DASD 8 in microcomputer 9 as well as a flowchart illustrating steps for performing functions of this invention. The data for the storage tables A50 and A51 is supplied to the microcomputer 9 (from the database computer system 10 of FIG. 1B) as indicated by line 11A.

Within the microcomputer 9 line 11A connects to lines 11B and 11C which symbolized datapath connections of data between elements within the microcomputer 9. Line 11B connects from line 11A to table A50 and line 11C connects from line 11A to table A51, as will be well understood by those skilled in the art. When loaded with the data as indicated by line 11A (from database computer system 10) the microcomputer 9 and the sequence of steps of this invention are performed therein, interacting with the DASD 8 to perform a sequence of costing steps to determine the cost of manufacturing of integrated circuits.

As stated above the data in DASD 8 of FIG. 1A comprises Recipes Table A50, Parts Table A51, Product Mix Table A20, Equipment Table A3A and Overhead Table A40 in FIG. 1A. The Recipes Table A50 supplies data on line 17 to connector (E) to FIG. 3B and on line 18 to Required Hours Computing (including machine and labor hours) Required Labor Hours step B10. Parts Table A51 supplies data on line 22 to step B10 and Product Mix Table A20 supplies data on line 20 to step B10, also. Step B10 supplies data on connector (Z) to step A60 in FIG. 2 and on line 24 to Equipment Required and Hours & Required Runs step B11 which supplies data on lines 29 to Depreciation Hourly Rate ($/Hr) Calculation step B20 and on line 30 to Overhead/ Hourly Rate ($/Hr) Calculation step B22. Equipment Table A3A supplies data on line 32 to step B20. Overhead Table A40 supplies data on line 45 to step B22.

Part of the process of this invention is started at Start step 39 which initiates the classification cost step A10 which supplies cost item data to the microcomputer 9. A cost operation data is performed relating to classifying cost items including DM (Direct Material) Table A3B0 in FIG. 3A, Overhead Table A40 in FIG. 1A, etc. into a table in memory 7M and stored in DASD 8 for retrieval in the future by the microcomputer 9.

The next step after the classification cost step A10 is the classified cost step 41. Step 41 loads classified cost items into the memory 7M for use in future operations. Step 41 leads to overhead step B22.

In step B22 the hourly rate ($/hr) of overhead is calculated. Data is supplied from classified cost item 41. In addition, data is supplied from overhead table A40 as indicated by line 45. Another source of data for step B22 is the data from the equipment required step B11 as indicated by line 30.

Figure 3A:
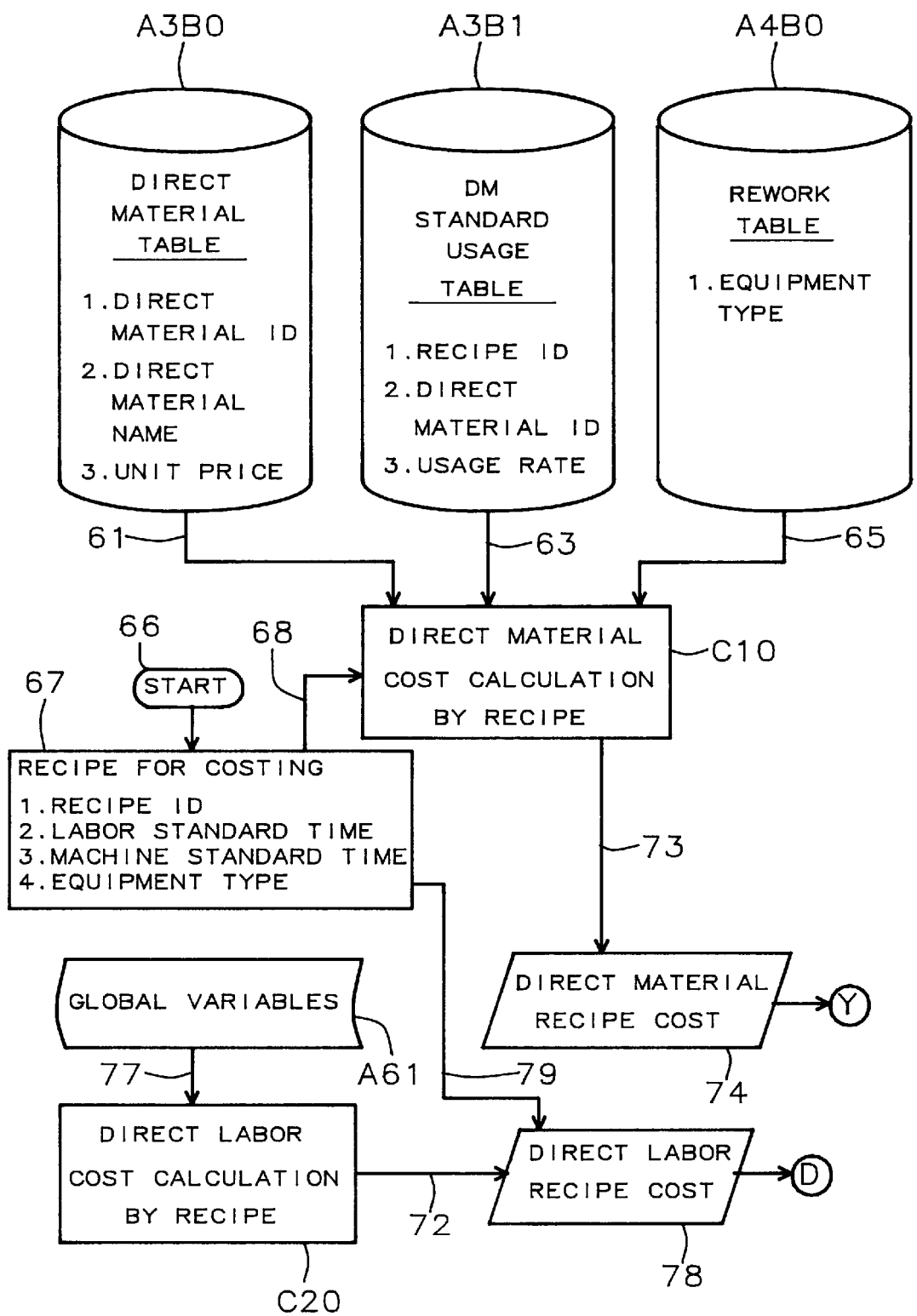
FIGS. 3A and 3B show a complementary portions of a flowchart of some additional steps performed in the microcomputer (shown in FIG. 1B) employing outputs from FIG. 1A.
Figure 3B:
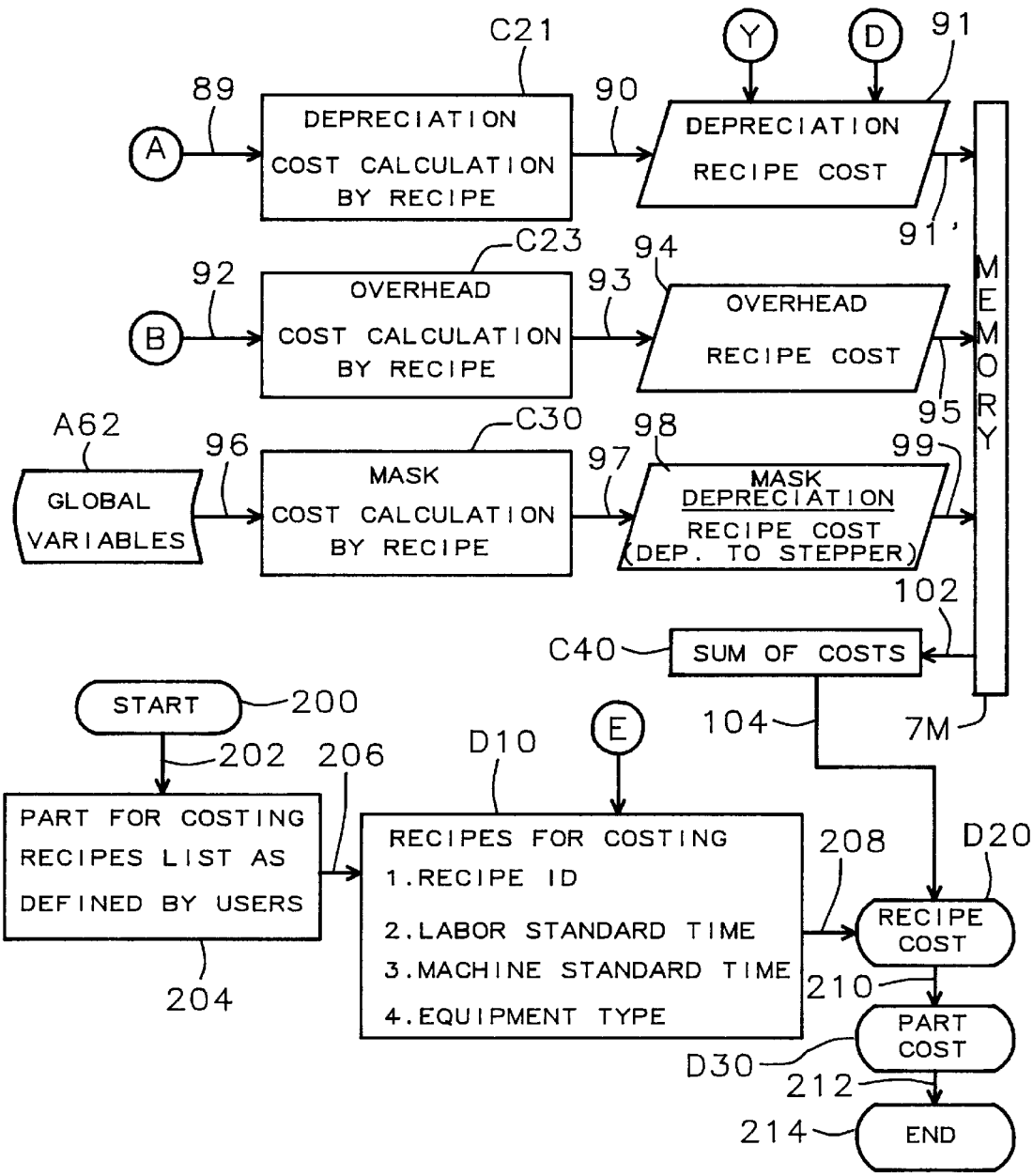

The data from step B22 is provided on line 46 to the overhead/hourly rate step 47 which calculates the overhead hourly rate to provide overhead hourly rate data which is supplied via connector (B) via line 92 in FIG. 3B for use in overhead, cost calculation by recipe step C23.

The result of the hourly rate calculation of depreciation produces data for use in step B20 is supplied as indicated by line 35.

In step B21, the hourly rate of depreciation is calculated based upon the output from step B20 as indicated by line 35 an described in section B(2)I.

The output of depreciation hourly rate step B21 in FIG. 1A is provided via connector (A) to depreciation cost calculation by recipe step C21 in FIG. 3B.

The functions performed in FIG. 1A are described in further detail below.

Figure 2:
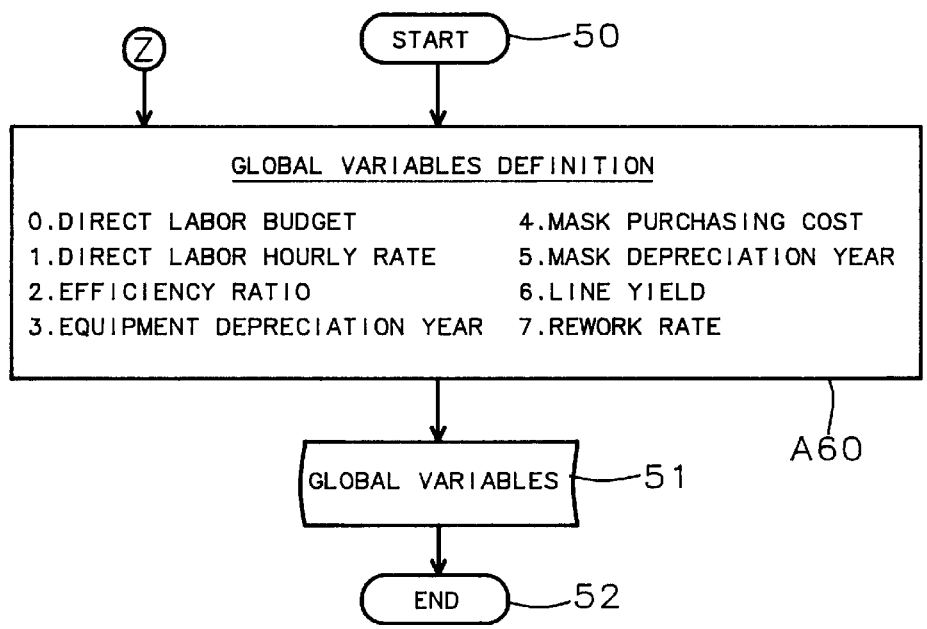
FIG. 2 shows a flowchart of steps used in the microcomputer of FIGS. 1A and 1B for performing component steps of this invention with output connections from FIG. 1A.

FIG. 2 shows another flowchart of steps used in the microcomputer 9 of FIGS. 1A and 1B for performing component steps of this invention. The functions performed in FIG. 2 are described in further detail below.

FIG. 3A shows a flowchart of some additional steps performed in the microcomputer 9 (shown in FIG. 1B.) The flowchart of FIG. 3A includes among other elements, the storage tables A3B0, A3B1, and A4B0 located in the DASD 8 within the microcomputer 9 (shown in FIG. 1B.) FIG. 3B shows a flowchart which complements the flowchart of FIG. 3A. The functions performed in FIGS. 3A and 3B are described in detail below.

Cost IC Product Manufacturing Process

A. Basic Data Preparation Process

A(1) Classify Cost Items

Referring to the flowchart of FIG. 1A, a portion of the process of this invention is started at step 39. Step 39 leads to the classification cost step A10 which supplies cost item data to the microcomputer 9 according to cost characteristics provided by user data entered into a data collection system. Classification of cost operation data is performed relating to classifying cost items including DM (Direct Material) Table A3B0 in FIG. 3A, Overhead Table A40 in FIG. 1A, etc. into a table in memory 7M and stored in DASD 8 for retrieval in the future by the microcomputer 9.

The sequence of steps performed by classification cost step A10 includes preparation of the data pertaining both to direct material (DM) costs; and to overhead costs, as follows:

I. Direct Material (DM) Cost, which includes:
(1) Wafer Cost
(2) Photoresist Cost
(3) C/W Cost & D/W Cost
C/W Purchasing cost/piece * usage rate, the usage rate is set on the annual plan (e.g. per prime wafer used will also require ¼ C/W)
D/W Purchasing cost/piece * usage rate,
(4) Target Cost
II. Overhead Costs
a. Fixed Costs:
(1) Housing Costs
(2) Building Costs
3) Indirect Labor Costs
(4) Indirect Material Costs
b. Variable Costs:
(1) Special Gas Costs
(2) Chemical Costs The classification data of step A10 is stored at the end of step A10 into DASD 8.

The next step after the classification cost step A10 is the clerical operation comprising classified cost step 41. Step 41 loads classified cost items into the memory 7M for use in future operations.

Step 41 leads to overhead step B22, for use in step B(2) below.

A(2) Define Product Mix for a Month

Referring to the product mix table A20 in FIG. 1A, the next step in accordance with this invention is to define the product mix for a month in advance by accessing data in the product mix table A20 stored in the DASD 8, as follows:
(1) Part ID data and
(2) Production Quantity.

At the end of step A20, the product mix data of step A20 is stored in DASD 8.

The output data obtained from product mix table A20 is available as indicated by line 22 during the required hours computing step B10 which is described in section B1 below.

| Example | |
|---|---|
| Product No. or | 4M DRAM  1000 pieces |
|  | 16M DRAM  500 pieces |

A(3A) Define Equipment Table

Data comprising the equipment table A3A in FIG. 1A, is defined in the storage device 8. The table A3A includes data, as follows:
(1) Equipment Type
(2) Purchasing Price,
(3) Maintenance Rate, and
(4) Batch Size The resulting output data from table A3A is available as indicated by line 32 for use in the depreciation step B20 which performs the hourly rate ($/hr) calculation for the equipment required in manufacturing the products as described in section B(2) below.

| | Maintenance | |
|---|---|---|
| Stepper $2M | 6% | batch size |
| A(3B) DirectMaterialandDMStandardUsageTables | | |

Referring to FIG. 3A, the next two steps performed simultaneously are to define the direct material (DM) table A3B0 (including cost) and DM standard usage table A3B1.

With respect to direct material table A3B0, the resulting output data is available as indicated by line 61 for use in the direct material step C10 which is described below in section C(2).

The data supplied by direct material table A3B0, the data supplied comprises:
(1) Direct Material ID,
(2) Direct Material Name, and
(3) Unit Price.

With respect to DM (direct material) standard usage table A3B1, the resulting output data is available as indicated by line 63 for use in direct material step C10 described in section C(1) below.

The data supplied by usage table A3B1 comprises:
(1) Recipe ID
(2) Direct Material ID, and
(3) Usage Rate.

Example

R1 photoresist 5cc.

A(4A) Define the overhead table A40 in FIG. 1A in the microcomputer 9 to supply data as indicated by line 45 to overhead step B22.

Example: No chemical cost

Table A40 in FIG. 1A includes:
(1) Overhead ID,
(2) Overhead Name, and
(3) Cost (according to budget).

A(4B) Rework Table

Referring to FIG. 3A the next step is to define the rework table A4B0 by equipment type. The data from table A4B0 is supplied as indicated by line 65 to the direct material step C10.

Rework table A4B0 includes data as follows:
1) Equipment Type

A(5) Download Procedure:

Referring to FIGS. 1A and 1B, the next step is perform a download procedure to supply data from host database computer system 10 to microcomputer 9 via line 11A from database computer system 10 to a microcomputer 9. The lines 11B and 11C connect within microcomputer 9 from line 11A to recipes table A50 and parts table A51 in the DASD 8.

I. Recipes Table

Referring to FIG. 1A, the recipes table A50 is filled from database computer system 10 with data as follows:
(1) Recipe ID,
(2) Standard Labor Time,
(3) Standard Machine Time, and
(4) Equipment Type.

The output of recipes table step A50 is on line 17 to connector (E) which links to step D10 in FIG. 3B. FIG. 3B show a flowchart which complements the flowchart of FIG. 3A. In addition step A50 provides data on line 18 for use in step B10 in FIG. 1A.

II Parts Table

Referring to FIG. 2A the parts table A51 is filled from database computer system 10 with data as follows:
(1) Part ID,
(2) Equipment Type,
(3) Recipe ID

| Product No. or or 4M DRAM | R1 R2 . . . | EQUIPMENT TIME LABOR TIME |
|---|---|---|
| 16M DRAM | R1 R2 . . . | |

The output of parts table step A51 is on line 20 to provide data for use in step B10 in FIG. 1A.

A(6) Global Variables

A(6) I. Global Variables Definition

Referring to FIG. 2, a flowchart is shown which shows the steps required to define and store the global variables used in the sequence of steps of this invention. At step 50, the sequence of steps begins. Step 50 leads to step A60 which provides for defining the global variables. In addition, the output from step B10 in FIG. 1A is provided by connector (Z) to the step A60. Step A60 provides data for use in step 51 in which the global variables are stored in the global variables data storage area in the memory 7M in FIG. 1B. 8. The data provided by step A60 is as follows:

(0) Direct Labor Budget
(1) Direct Labor Hourly Rate=Monthly budget for labor/Monthly required labor hours
(2) Efficiency ratio,
(3) Equipment depreciation year,
(4) Mask purchasing cost,
(5) Mask depreciation year,
(6) Line yield,
(7) Rework rate Examples of Above Global Variables
The budget per month for:
a. Labor,
b. Yield,
c. Rework rate.

A(6) II. Global Variable Cost Table

The global variable cost table 51 is supplied to a storage space in memory 7M which is filled from the global variables definition step A60 in FIG. 2.

When all the global variables have been stored in step 51 the next step is step 52 where the sequence of steps illustrated by FIG. 2 ends.

Referring to FIG. 3A, a first global variables source A61 is connected from memory 7M by line 77 to supply data global variables in the table to direct labor step C20 which is described in further detail in step C3 below.

Referring to FIG. 3B, a second global variables source A62 is connected from memory 7M by line 96 to supply data global variables table data to mask step C30 which is described in further detail in step C3 below.

B. Hourly Rate Calculation

B(1) Referring to FIG. 1A, the next step B10 in the sequence of steps is to compute the required hours of computing (including machine and labor hours) and labor hours required to perform the manufacturing operations required during the month. The data obtained in the sequence of steps in section A(2) stored in the product mix table A20 and in section A(5) stored in recipes table A50 as indicated by line 18 and parts table A51 as indicated by line 20 are used to calculate the required hours of equipment required to operate to produce the parts required.

Step B10 provides an output on line 24 to step B11 and on connector (Z) to step A60 in FIG. 2.

Following step B10, the results of the calculation of step B10 are supplied as indicated by line 24 for use in step B11 which includes a sequence of operations such as the clerical operation of determining in the equipment required step B11, the hours and required runs. The results of the calculation in step B11 are available as indicated by line 29 for use in depreciation step B20 and as indicated by line 30 for use in overhead step B22.

Example

| Product No. | 4M | DRAM | R1 | LASER | MARK | TIME MACHINE 5 min. | TIME LABOR 1 min. |
|---|---|---|---|---|---|---|---|
| . | . | . | . | . | . | . | . |
| . | . | . | . | . | . | . | . |
| . | . | . | . | . | . | . | . |

To manufacture a 4 MDRAM, Recipe R1 requires that the laser mark needs 5 * 1,000=5,000 minutes of machine time and 1 * 1,000=1,000 minutes of labor time to finish 1,000 pieces of the 4M DRAM.

B(2) Calculation of Depreciation and Overhead from the steps described in sections B(1), A(4) and A(6) above, calculate depreciation of equipment overhead.

B(2)I. Depreciation: Hourly Rate ($/hr) Calculation

In step B20 in FIG. 1A, the hourly rate ($/hr) is calculated based on data (indicated by line 32) obtained from the equipment table provided by step described in section A(3A) and also based on data (supplied as indicated by line 29) produced in step B11 as which calculated the equipment required, hours and required runs. The result of the hourly rate calculation of depreciation produces data for use in step B21 as indicated by line 35.

B(2)IIA. Depreciation: Hourly Rate

In step B21, the hourly rate of depreciation is calculated based upon the output from step B20 as indicated by line 35 as described in section B(2)I. The output of step B21 is provided via connector (A) to depreciation cost calculation by recipe step C21 in FIG. 3B.

B(2)IIB. Depreciation: Hourly Rate

Referring to FIG. 3B, the connector (A) to the depreciation cost calculation by recipe step C21 receives the data from step B21. Step B21 provides data as indicated by line 89 for use in step C21.

Example

For a stepper,
where
[D]=monthly depreciation cost=$2,000/month
[H]=required stepper hours=60 hours/month
[D]/[H]=hourly depreciation rate
$2,000/60=$33.33/hour The above equation is for five years which equals 60 months, i.e. 12 months times 5 years.

Using the same logic, we can calculate the hourly rate of the depreciation type of overhead of each piece of equipment used in the manufacturing sequence of steps.

B(2) III. Overhead Hourly Rate ($/hr) Calculation

Referring to FIG. 1A, in step B22 the hourly rate ($/hr) of overhead is calculated based upon the output from sequence of steps A(4), A(6) and B(1). Data is supplied from classified cost item 41 which was produced as a result of the steps of section A(1). In addition, data is supplied from overhead table A40 as indicated by line 45. Another source of data for step B22 is the data from the equipment required step B11 as indicated by line 30.

Overhead: Hourly Rate

The data from step B22 is provided to the overhead/hourly rate step 47 which calculates the overhead hourly rate to provide overhead hourly rate data which is supplied via connector (B) on line 92 for use in overhead, cost calculation by recipe step C23 in FIG. 3B.

B(3) Calculation of Direct Labor Cost

Calculate direct labor cost, using the outputs of steps A(5)2, where standard labor time is provided and A(6) where direct labor hourly rate is provided.

Assumptions $$\text{Hourly Rate} = \frac{(\$30,000 \text{ per month})}{\begin{vmatrix} \text{Required labor hours based} \\ \text{on product mix and part flow} \end{vmatrix}}$$

$$= \frac{\$30,000}{240 \text{ hr.}}$$

$$= \$125/\text{hr.}$$

The above function if performed in FIG. 1A and FIG. 2.

C. COST CALCULATION (FINAL)

C(1) Calculate Direct Material Cost.

Referring to FIG. 3A, as the first step in phase C of a sequence of steps, step 66 STARTs the cost calculation sequence. Step 66 leads to step 67 which provides the recipe for costing. The recipe for costing of step 67 obtains data from the steps of the above section A(1) and the above section A(3B) supplying data as follows:
(1) recipe ID,
(2) labor standard time,
(3) machine standard time, and
(4) equipment type The data obtained in step 67 is supplied as indicated by line 68 for use in the next step C10 which provides direct material cost calculation by recipe and by line 79 to Direct Labor/Recipe Cost 78.

In step C10, use is made of the direct material data from section A(1) classification step A10 in FIG. 1A as well as the data from direct material table A3B0, DM standard usage table step A3B1 described in section A(3)b plus the data from Rework Table step A4B0 described in section A(4)b. That is to say that the combined data from steps A3B0, A3B1 A4B0 and the recipe for costing step 67 is supplied to direct material, cost calculation by recipe step C10 as indicated by lines 61, 63, 65 and 68 respectively.

The output from step C10 is supplied as indicated by by line 73 to direct material, recipe cost step 74 which provide a clerical function.

The direct material, recipe cost step 74 provides an output as indicated by connector (Y) to step 91 in FIG. 3B.

Example

For recipe R1 the cost is calculated as follows:

(direct material usage) * (unit cost)→cost of R1

Note: In each case, to calculate full sequence of steps cost, first calculate the cost of each recipe and then sum up those costs.

| Type of Device | Recipe | Subtotal | Direct Labor | Direct Material | Overhead |
|---|---|---|---|---|---|
| 4Megabyte DRAM | R1 | 200 | 80 | 20 | 100 |
| | R2 | 300 | | | |
| | . | . | | | |
| | . | . | | | |
| | . | . | | | |
| | Rn | | | | |
| Totals | | | | | |

C(2) Calculate Direct Labor, Depreciation, and Overhead.

The resulting data from the steps described in sections B(2), B(3), and B(5) is used in the next sequence of steps to calculate direct labor, depreciation, and overhead.

In step A50, a search is made of the data in the recipes table (formed in step described in section A(5)) for a given recipe, such as recipe R1. For example, that search could provide data, as follows:

| R1 | Equipment | Machine Time | Labor Time |
|---|---|---|---|
| | | 0.5 hr | 0.1 hr |

C(2) I. Direct Labor

The cost calculation by recipe of direct labor step C20 in FIG. 3A receives global variables data as indicated by line 77 from step A61 which reads the data from step described in section A(6) (from the memory 7M.) Step C20 receives data from line 77 as described in section C(2).

In step C20, the cost calculation is made by the formula as follows:

Cost calculation=(DL Hourly Rate * (Labor Standard Time)

Line 72 from step C20 indicates that data from step C20 in supplied for used in step 78 for determination of direct labor, recipe cost.

Example (Labor cost)=0.1 * (Direct Labor hourly rate B(3)) Section B(3) describes step A60 in FIG. 2 which provided data on the direct labor hourly rate.

Direct Labor, Recipe Cost

When the direct labor, recipe cost step 78 in FIG. 3A receives the output as indicated by line 79 from step 67 and the output as indicated by line 72 from step C20, it provides the direct labor recipe cost which is supplied, as indicated by connector (D), for use in step 91 included in the portion of the flowchart of this invention shown in FIG. 3B.

C(2) IIA. Depreciation: Cost Calculation by Recipe

The output from the depreciation, hourly rate step B21 in FIG. 1A is provided as indicated by connector (A) line 89 as a source of input data for step C21 which provides the depreciation: cost calculation by recipe.

Example (Depreciation cost)=0.5 * (Depreciation hourly rate (B(2))

Section B(2) above describes step B21 in FIG. 1A which supplies data via connector (A) for use in step C21 in FIG. 3B.

Step C21 provides output data as indicated by line 90 as one of the sources of input data for use in depreciation, recipe cost step 91.

C(2) IIB. Depreciation Recipe Cost

Depreciation, recipe cost step 91 takes data from connectors (Y) and (D) from FIG. 3A, as sources of input data as well as the data indicated by line 90 from step C21 and calculates the depreciation recipe cost. So far, a recipe cost consists of depreciation cost, DM cost (connector (Y)) and OL cost (connector (D)). Step 91 produces an output on line 91' to be stored in the memory 7M of the microcomputer 9 (FIG. 1B).

C(2) IIIA. Overhead Cost Calculation by Recipe

In overhead cost calculation by recipe step C23 data from step 47 in FIG. 1A is received as indicated by line 92. Step C23 provides overhead/cost calculation by recipe output data as indicated as indicated by line 93 to step 94.

Example (Overhead cost)=0.5 * (Overhead hourly rate B(2))

See description of step 83 in section B(2) above.

C(2) IIIB. Overhead: Recipe Cost

The overhead, recipe cost step 94 receives the data from line 93 and provides an output as indicated by line 95. Step 94 calculates the Overhead recipe cost. So far the recipe cost consists of depreciation cost, DM cost, DL cost and overhead cost. The output from Step 94 on line 95 is stored in the memory 7M of the microcomputer 9 (FIG. 1B).

Global Variables

As described above, second global variables source A62 loads data from DASD B in microcomputer 9 in FIG. 1A into memory 7M to supply data global variables table data as indicated by line 96 for use in step C30 as described below.

C(3) I. Mask: Cost Calculation by Recipe

The cost of masks is calculated in step C30 based upon recipe data from the mask purchasing cost and mask depreciation year data obtained by line 96 from the global variables data step A62. Step B11 supplies to the system required hours of stepper needed in step C30.

Mask Depreciation Hourly Rate=Mask Depreciation Cost

Mask Recipe Cost=(Mack Hourly Rate) * (Standard Time of Stepper)

It should be noted that mask cost is allocated only to "stepper" equipment.

C(3) II. Mask Depreciation: Recipe Cost

Next, mask depreciation recipe cost step 98 is performed. Step 98 receives an input from line 97. The output from Step 98 on line 99 is stored in the memory 7M of the microcomputer 9 (FIG. 1B.) The masks are depreciated as a function of the degree of use of steppers in the manufacturing sequence of steps.

Mask Investment/Depreciation Period * 1/Stepper Required Hour= Mask hourly rate

If R1 is "stepper", then the mask cost is calculated by the formula:

Mask Cost=(Machine Time) * (Mask Hourly Rate)

C(4) Recipe Cost

In sum of costs step C40, costs are added together to obtain a sum equal recipe cost.

From steps 74, 78, 91, 94 and 98 we calculate recipe costs respectively and keep summation information in sequence so at the end of step 98, the recipe costs have been summed for use in sum of costs step C40 with the data supplied on line 102 from memory 7M.

D. For part costing

Referring to FIG. 3B, step 200 starts the part costing sequence of steps. In step 200, data is brought from the host computer 10 to begin the costing recipe. Step 200 leads via line 202 to step 204.

Part for Costing

In step 204, the part for costing step is performed. A set of recipes list is defined which is used for costing. Step 204 leads via line 206 to step D10.

D(1) Recipes for Costing

The next step is the recipes for costing step D10 shown in FIG. 3B. Step D10 involves the downloading to cost microcomputer 9 of a part process from database computer system 10 by a connection from connector (E) with data from recipes Table A50 in FIG. 1A. The data provided in step D10 includes multiple records for recipes costing, as follows:
(1) Recipe ID,
(2) Labor Standard Time,
(3) Machine Standard Time, and
(4) Equipment Type Appending Procedure In step D10, an appending procedure is performed using the data from lines 206 and the data from recipes table established in step A50, as described in section A(5) above. The data in step A50 is connected as indicated by connector (E) from FIG. 1A. Step D10 provides an output as indicated by line 208 to the step D20.

The data from step D10 is provided on line 208 for use in step D20.

Referring to FIG. 3B, an additional sequence of steps which are performed aside from phases A, B and C are described next.

Recipe for Costing

The recipe for costing recipe ID is calculated in step 204.

The recipe for costing step 204 receives the input data as indicated by line 202 from step 200. The data provided is as follows:
(1) Recipe ID,
(2) Labor Standard Time,
(3) Machine Standard Time, and
(4) Equipment Type Step 204 provides an output as indicated by line 206.

D(2) Recipe Cost

The recipes cost step D20 calculates the cost of each recipe (which recipes are define in the recipes list of the costing part of the system) based on an input as indicated by line 104 from step C40 and the input on line 208 from step D10. Step D20 provides data via line 210 to step D30.

D(3) Part Cost

In this step D30, the recipes costs to build a part are summed. The result of step D30 leads as indicated by line 212 to step 214 which provides the END of the process.

Figure 4:
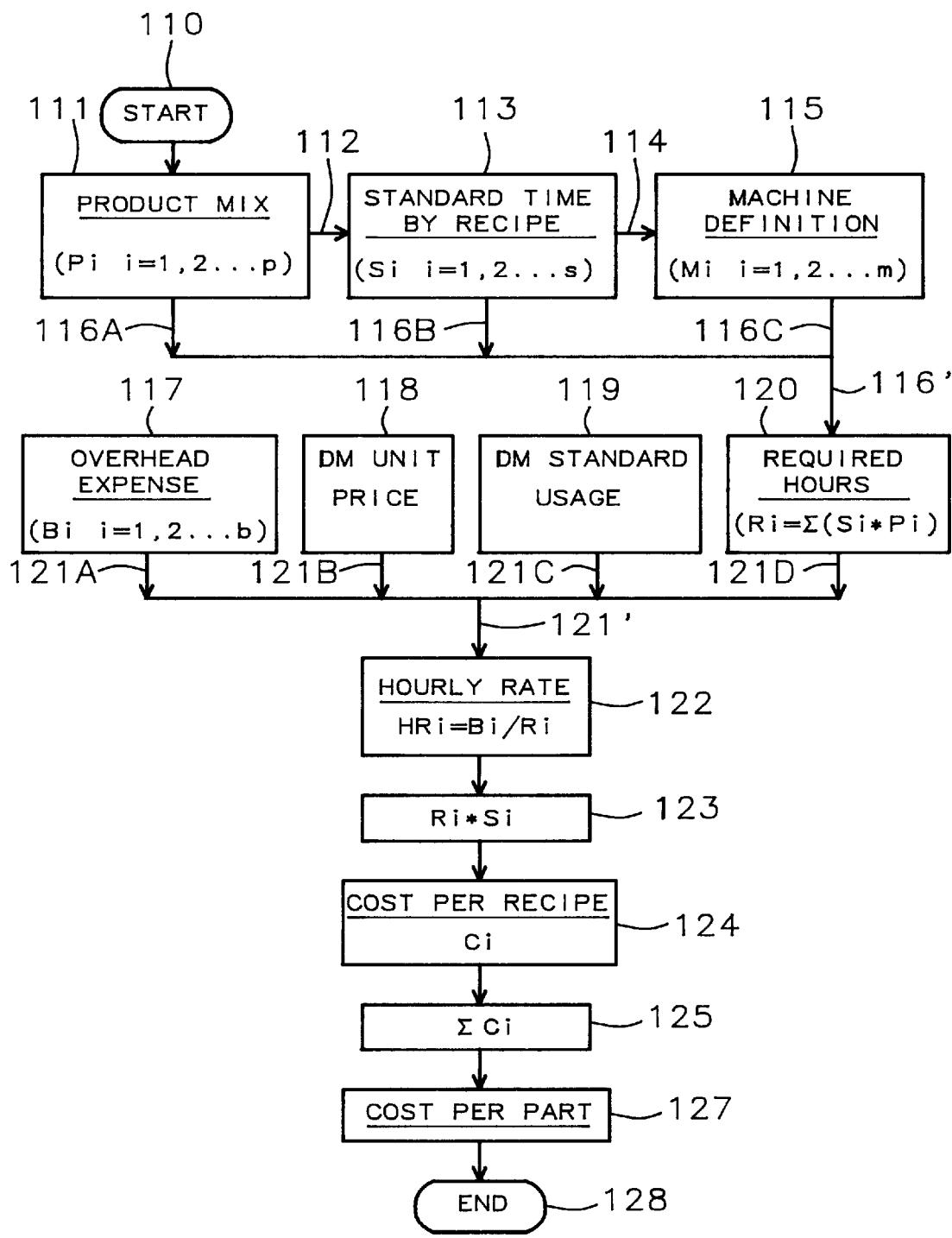
FIG. 4 shows the standard cost determination procedure in accordance with this invention included in the microcomputer of FIG. 1B.

FIG. 4 shows the standard cost determination procedure in accordance with this invention included in microcomputer 9.

The first step 110 is to start the sequence of steps.

Following step 110, step 111 determines the product mix providing output data on both line 112 and line 116A.

Step 111 calculates the equation as follows:

$$(P_i\ i=1, 2 \ldots p)$$

The second step is to determine the standard time by recipe in step 113 with outputs as indicated by line 114 and as indicated by line 116B. Step 113 calculates the equation as follows:

$$(S_i\ i=1, 2 \ldots s)$$

Step 115 determines the machine definition. Step 115 provides an output on 116C. Step 115 calculates the equation as follows:

$$(M_i\ i=1, 2 \ldots m)$$

The fourth step is to determine the overhead expense in step 117. Step 117 provides an output on 121A. Step 117 calculates the equation as follows:

$$(B_i\ i=1, 2 \ldots b)$$

The fifth step is to determine the DM unit price in step 118. Step 118 provides an output on 121B.

The sixth step is to determine the DM standard usage in step 119. Step 119 provides an output on 121C.

The seventh step is to determine the required hours in step 120. Step 120 provides an output on 121D. Step 120 calculates the equation as follows:

$$(R_i = \Sigma(S_i * P_i)$$

The outputs as indicated by lines 121A to 121D are connected by line 121' to hourly rate step 122.

The output of step 122 is provided to step 123 which calculates the value, as follows:

$$(R_i * S_i).$$

The next step is step 124 which calculates the equation as follows:

$$HR_i = B_i/R_i$$

The output of step 123 is connected to cost per recipe step 124.

The output of step 124 is provided to step 125 $\Sigma C_i$. Step 125 calculates the value as follows:

$$\Sigma C_i$$

The output of step 125 is connected to cost per part step 127.

The next step is the step 128 which ends the sequence of steps in the flowchart of FIG. 4.

| | V184-0048 Process Model Basic EQUIPMENT TYPE: ALIGNER | | |
|---|---|---|---|
| PART/ PRODUCT | PROCEDURE CMOS_METAL | RECIPE 3rd layer align | OPERATION |
| VG-1.0 μm | INITIAL_ OXIDE | | Created: date Owner: Johnson Temperature Limits: Low: 22° C., High: 23° C. Humidity Limits: Low: 42% High: 49% |
| | DIFFUSION | | (1) Align Exposure Mask |
| | MASK_1 | | (2) Develop 1 min, 30° C. |
| | ETCH | | (3) Enter CD (Critical Dimension) Measurements |
| | IMPLANT METAL PASSIVATION | | |

While this invention has been described in terms of the above specific embodiment(s), those skilled in the art will recognize that the invention can be practiced with modifications within the spirit and scope of the appended claims, i.e. that changes can be made in form and detail, without departing from the spirit and scope of the invention. Accordingly all such changes come within the purview of the present invention and the invention encompasses the subject matter of the claims which follow.

Having thus described the invention, what is claimed as new and desirable to be secured by letters patent is as follows:

1. A computer system for determining the costing of the manufacturing process for a part, said computer system including the combination of a data base computer and a manufacturing cost computer, said cost computer including a central processor, a memory, and a direct access storage device with tables of data including global variables, a recipe table, a parts table, a product mix table, an equipment table, an overhead table, a direct material table, a direct material standard usage table, and a rework table, said system providing the functions as follows:

A) preparing data for use in costing,
B) calculating hourly overhead and depreciation rates for said part, by the steps as follows:
  1) said cost computer calculating required machine and labor hours and then calculating equipment required hours data and required runs data for equipment by accessing recipes data from said recipes table, production quantity data from said product mix table in said storage device and parts type data from said parts table in said storage device,
  2) said cost computer calculating depreciation hourly rate data from said equipment required hours data and said required runs data and from data from said equipment table, and
  3) said cost computer calculating overhead hourly rate data from said required hours data and said required runs data and from data obtained from said storage device from said overhead table,
C) calculating depreciation, overhead and mask depreciation recipe costs for said part, and
D) calculating part costs for said part.

2. A computer system in accordance with claim 1 wherein data is downloaded from said data base computer to said cost computer.

3. A computer system in accordance with claim 1 wherein a sequence of steps is provided for defining global variables.

4. A computer system in accordance with claim 1 wherein a sequence of steps is provided for providing a recipe for costing.

5. A computer system in accordance with claim 1 including the steps wherein said function of preparing data for use in costing includes entering cost data into said cost computer and forming tables of data therein, and downloading data from said data base computer into tables in said cost computer.

6. A computer system in accordance with claim 5 wherein data is downloaded from said data base computer to said cost computer.

7. A computer system in accordance with claim 6 wherein a sequence of steps is provided for defining global variables.

8. A computer system in accordance with claim 7 wherein a sequence of steps is provided for providing a recipe for costing.

9. A method of operating a computer system for determining the costing of the manufacturing process for a part,
said computer system including the combination of a data base computer and a manufacturing cost computer,
said cost computer including a central processor, a memory, and a direct access storage device with tables of data including global variables, a recipe table, a parts table, a product mix table, an equipment table, an overhead table, a direct material table, a direct material standard usage table, and a rework table, said system providing the functions as follows:

A) preparing data for use in costing,
B) calculating hourly overhead and depreciation rates for said part, by the steps as follows:
  1) said cost computer calculating required machine and labor hours and then calculating equipment required hours data and required runs data for equipment by accessing recipes data from said recipes table production quantity data from said product mix table in said storage device and parts type data from said parts table in said storage device,
  2) said cost computer calculating depreciation hourly rate data from said equipment required hours data and said required runs data and from data from said equipment table, and
  3) said cost computer calculating overhead hourly rate data from said required hours data and said required runs data and from data obtained from said storage device from said overhead table,
C) calculating depreciation, overhead and mask depreciation recipe costs for said part, and
D) calculating part costs for said part.

10. A method of operating a computer system in accordance with claim 9 wherein data is downloaded from said data base computer to said cost computer.

11. A method of operating a computer system in accordance with claim 9 wherein a sequence of steps is provided for defining global variables.

12. A method of operating a computer system in accordance with claim 9 wherein a sequence of steps is provided for providing a recipe for costing.

13. A method of operating a computer system in accordance with claim 9 including the steps wherein said function of preparing data for use in costing includes entering cost data into said cost computer and forming tables of data therein, and downloading data from said data base computer into tables in said cost computer.

14. A method of operating a computer system in accordance with claim 13 wherein data is downloaded from said data base computer to said cost computer.

15. A method of operating a computer system in accordance with claim 14 wherein a sequence of steps is provided for defining global variables.

16. A method of operating a computer system in accordance with claim 15 wherein a sequence of steps is provided for providing a recipe for costing.

17. A computer system for determining the costing of the manufacturing process for a part,
said computer system including a data base computer (10) and a manufacturing cost computer (9), said cost computer including a central processor (7), a memory (7M), and a direct access storage device (8) with tables of data including a recipes table (A50), a parts table (A51), a product mix table (A20), an equipment table (A3A), an overhead table (A40), a direct material table (A3B0), a direct material standard usage table (A3B1), and a rework table (A4B0), A) said system preparing data for use in costing by the steps as follows:
  1) entering cost classification data into a classified cost item table (41) in said memory (7M) in said cost computer (9),
  2) defining said product mix table (A20) in said storage device (8),
  3)
    a) defining said equipment table (A3A) in said storage device (8),
    b) defining direct material usage in said direct material table (A3B0) and defining said direct material standard usage table (A3B1) in said storage device (8),
  4)
    a) defining said overhead table (A40) in said storage device (8), b) defining said rework table (A4B0) in said storage device (8),
5) downloading data from said data base computer (10) into said recipes table (A50) and said parts table (A51) in said storage device (8),
6) defining a global variables cost table (50) in a global variables location in said memory (7M), B) said system calculating recipe costs for said part by the steps as follows:
1)
   a) said cost computer calculating required machine hours and required labor hours for equipment (B10) by accessing production quantity data from said product mix table (A20) in said storage device (8) and equipment type data from said parts table (A51) in said storage device (8) and
   b) then said cost computer calculating required hours and required runs data (B11) from calculating required machine hours and required labor hours for equipment (B10),
2) said cost computer calculating depreciation rate data (B20) from said required hours and said required runs data (B11) and from said equipment table (A3A), then supplying said depreciation hourly rate (B21) for depreciation cost calculation by recipe (C21)
3) said cost computer calculating overhead data (B22) from said required hours and said required runs data (B22) and from data obtained from said storage device in said overhead table and calculating overhead hourly rate (47) from said overhead data (B22), C) calculating final costs for said part by the steps as follows:
1) said cost computer calculating:
   a) direct material recipe cost data (C10) from data in a Recipe for Costing (67) and from data in said Direct Material Table (A3B0), said DM Standard Usage Table (A3B1), and said Rework Table (A4B0),
   b) said cost computer calculating direct labor recipe cost data (C20) from data in a global variables (A61) and then calculating direct labor recipe cost (78) from said Recipe for Costing (67), and
2) said cost computer calculating costs by the steps as follows:
   a) said cost computer calculating direct labor recipe cost data (78) from Recipe for Costing data (67), said global variables (A61) and said Direct Labor Cost Calculation by Recipe (C20),
   b) said cost computer calculating depreciation recipe cost data (91) from said depreciation cost calculation by recipe (C21), said direct material recipe cost data (74) and said direct labor recipe cost data (78),
   c) said cost computer performing overhead cost calculation by recipe (C23) from said overhead hourly rate data (47) and finding overhead recipe cost data (94) from said overhead cost calculation by recipe (C23),
3) said cost computer calculating mask cost calculation by recipe data (C30) from a global variables table (A62) and providing mask depreciation recipe cost data (98) cost data from mask cost calculation by recipe data (C30),
4) providing the sum of recipe costs (C40) from cost data (91, 94, 98) in said memory (7M),
5) providing a part for costing recipes list as defined by users and recipes for costing recipe ID, labor standard time, machine standard time, and equipment type (204, D10),
6) determining recipe cost (D20) from said sum of costs (C40) and said recipes for costing data (D10), and
7) determining part cost data (D30) from said recipe cost data (D20).

18. A method for determining the costing of the manufacturing process for a part,
said computer system including a data base computer (10) and a manufacturing cost computer (9), said cost computer including a central processor (7), a memory (7M), and a direct access storage device (8) with tables of data including a recipes table (A50), a parts table (A51), a product mix table (A20), an equipment table (A3A), an overhead table (A40), a direct material table (A3B0), a direct material standard usage table (A3B1), and a rework table (A4B0), A) said method comprising employing said system to prepare data for use in costing by the steps as follows:
1) entering cost classification data into a classified cost item table (41) in said memory (7M) in said cost computer (9),
2) defining said product mix table (A20) in said storage device (8),
3)
   a) defining said equipment table (A3A) in said storage device (8),
   b) defining direct material usage in said direct material table (A3B0) and defining said direct material standard usage table (A3B1) in said storage device (8),
4)
   a) defining said overhead table (A40) in said storage device (8),
   b) defining said rework table (A4B0) in said storage device (8),
5) downloading data from said data base computer (10) into said recipes table (A50) and said parts table (A51) in said storage device (8),
6) defining a global variables cost table (50) in a global variables location in said memory (7M), B) said method comprising employing said system for calculating recipe costs for said part by the steps as follows:
1)
   a) employing said cost computer for the step of calculating required machine hours and required labor hours for equipment (B10) by accessing production quantity data from said product mix table (A20) in said storage device (8) and equipment type data from said parts table (A51) in said storage device (8), and
   b) then calculating required hours and required runs data (B11) in said cost computer from said step of calculating required machine hours and required labor hours for equipment (B10),
2) having said cost computer calculate depreciation rate data (B20) from said required hours and said required runs data (B11) and from said equipment table (A3A), then supplying said depreciation hourly rate (B21) for depreciation cost calculation by recipe (C21),
3) having said cost computer calculate overhead data (B22) from said required hours and said required runs data (B22) and from data obtained from said storage device in said overhead table and calculating overhead hourly rate (47) from said overhead data (B22), C) calculating final costs for said part by the steps as follows:
1) having said cost computer calculate
   a) direct material recipe cost data (C10) from data in a Recipe for Costing (67) and from data in said Direct Material Table (A3B0), said DM Standard Usage Table (A3B1), and said Rework Table (A4B0),
   b) having said cost computer calculate direct labor recipe cost data (C20) from data in a global variables (A61) and then calculating direct labor recipe cost (78) from said Recipe for Costing (67), and
2) having said cost computer calculate costs by the steps as follows:
   a) having said cost computer calculate direct labor recipe cost data (78) from Recipe for Costing data (67), said global variables (A61) and said Direct Labor Cost Calculation by Recipe (C20),
   b) having said cost computer calculate depreciation recipe cost data (91) from said depreciation cost calculation by recipe (C21), said direct material recipe cost data (74) and said direct labor recipe cost data (78),
   c) having said cost computer perform overhead cost calculation by recipe (C23) from said overhead hourly rate data (47) and finding overhead recipe cost data (94) from said overhead cost calculation by recipe (C23),
3) having said cost computer provide mask cost calculation by recipe data (C30) from a global variables table (A62) and providing mask depreciation recipe cost data (98) cost data from mask cost calculation by recipe data (C30),
4) providing the sum of recipe costs (C40) from cost data (91, 94, 98) in said memory (7M),
5) providing a part for costing recipes list as defined by users and recipes for costing recipe ID, labor standard time, machine standard time, and equipment type (204, D10),
6) determining recipe cost (D20) from said sum of costs (C40) and said recipes for costing data (D10), and
7) determining part cost data (D30) from said recipe cost data (D20).

* * * * *